(12) United States Patent
Schleith et al.

(10) Patent No.: US 10,853,971 B2
(45) Date of Patent: Dec. 1, 2020

(54) METHOD FOR DETERMINING THE EXPOSURE TIME FOR A 3D RECORDING

(71) Applicant: Carl Zeiss Industrielle Messtechnik GmbH, Oberkochen (DE)

(72) Inventors: Christian Schleith, Neubeuern (DE); Tom Jaeckel, Rosenheim (DE); Alexander Frey, Bernau a. Chiemsee (DE); Markus Basel, Raubling (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 15/886,489

(22) Filed: Feb. 1, 2018

(65) Prior Publication Data
US 2018/0218517 A1     Aug. 2, 2018

(30) Foreign Application Priority Data
Feb. 1, 2017   (DE) .................. 10 2017 000 908

(51) Int. Cl.
*G06T 7/80*      (2017.01)
*G06T 7/00*      (2017.01)
(Continued)

(52) U.S. Cl.
CPC ............ *G06T 7/85* (2017.01); *G06K 9/00201* (2013.01); *G06K 9/2027* (2013.01);
(Continued)

(58) Field of Classification Search
CPC .......... G06T 7/85; G06T 7/97; H04N 13/207; H04N 5/2353; H04N 13/189;
(Continued)

(56) References Cited

U.S. PATENT DOCUMENTS

| 7,570,370 B2 | 8/2009 | Steinbichler et al. |
| 7,957,639 B2 | 6/2011 | Lee et al. |

(Continued)

FOREIGN PATENT DOCUMENTS

| DE | 112011103006 T5 | 6/2013 |
| EP | 2869023 B1 | 6/2018 |
| WO | 2014078005 A1 | 5/2014 |

OTHER PUBLICATIONS

Office Action issued in German Counterpart Patent Application No. DE 10 2018 102 159.3, dated May 29, 2018 and English language machine translation thereof.

(Continued)

*Primary Examiner* — James M Pontius
(74) *Attorney, Agent, or Firm* — Falk Ewers; Ewers IP Law PLLC

(57) ABSTRACT

A method for determining an exposure, in particular an exposure time, for a recording in a method for determining the 3D coordinates of an object is provided, in which a pattern is projected onto the object and the light reflected by the object is recorded. To improve such a method, a recording of the object is produced with a predetermined exposure, in particular exposure time. A mask image of this recording is produced, in which mask image the regions of the object lying within the measurement volume are depicted. The exposure, in particular the exposure time, for the recording is determined depending on the predetermined exposure, in particular exposure time, depending on the mean greyscale value in the regions, lying within the measurement volume, of the recording with a predetermined exposure and depending on an ideal greyscale value.

17 Claims, 5 Drawing Sheets

(51) Int. Cl.
*G06K 9/00* (2006.01)
*H04N 13/189* (2018.01)
*G06K 9/46* (2006.01)
*H04N 5/235* (2006.01)
*G06K 9/20* (2006.01)
*H04N 13/207* (2018.01)
*G03B 7/093* (2006.01)

(52) U.S. Cl.
CPC ......... *G06K 9/4604* (2013.01); *G06K 9/4661* (2013.01); *G06T 7/97* (2017.01); *H04N 5/2353* (2013.01); *H04N 13/189* (2018.05); *H04N 13/207* (2018.05); *G03B 7/093* (2013.01); *G06K 2209/40* (2013.01); *H04N 5/2357* (2013.01)

(58) Field of Classification Search
CPC .. H04N 5/2357; G06K 9/4661; G06K 9/4604; G06K 9/2027; G06K 9/00201; G06K 2209/40; G03B 7/093
See application file for complete search history.

(56) References Cited

U.S. PATENT DOCUMENTS

| | | | |
|---|---|---|---|
| 2004/0179738 A1* | 9/2004 | Dai | G06T 7/0002 382/218 |
| 2008/0089583 A1* | 4/2008 | Messina | G06K 9/00234 382/167 |
| 2015/0116582 A1 | 4/2015 | Yoshikawa et al. | |
| 2015/0233707 A1 | 8/2015 | Huntley et al. | |
| 2016/0364872 A1 | 12/2016 | Nakajima | |
| 2017/0070726 A1* | 3/2017 | Goldentouch | G06T 7/521 |

OTHER PUBLICATIONS

Office Action issued in German Counterpart Patent Application No. DE 10 2018 102 159.3, dated Nov. 14, 2018 and English language machine translation thereof.

Office Action issued in German Counterpart Patent Application No. DE 10 2017 000 908.2, dated Nov. 14, 2018 and English language machine translation thereof.

\* cited by examiner

METHOD FOR DETERMINING THE EXPOSURE TIME FOR A 3D RECORDING

CROSS REFERENCE TO RELATED APPLICATIONS

This application claims priority to German patent application DE 10 2017 000 908.2, filed Feb. 1, 2017, the entire content of which is incorporated herein by reference.

TECHNICAL FIELD

The invention relates to a method for determining the exposure time for a recording in a method for determining 3D coordinates of an object. The method for determining the 3D coordinates of the object may be carried out using an apparatus including a projector for projecting a pattern onto the object and a camera for recording the light reflected by the object.

BACKGROUND

A method for determining 3D coordinates of an object is known from U.S. Pat. No. 7,570,370 B2.

U.S. Pat. No. 7,957,639 B2 describes a method for determining the 3D coordinates of an object, in which a pattern is projected onto the object. The object is recorded by a camera. Two images of the object are produced for determining the ideal exposure, namely a first image, in which the pattern is projected onto the object, and a second image, in which no pattern is projected onto the object. The ideal exposure is intended to be determined from these two images.

SUMMARY

It is an object of the invention to provide a method for determining the exposure for a recording in a method for determining the 3D coordinates of an object.

A pattern is projected onto the object in the method for determining the 3D coordinates of an object. In particular, the pattern is a stripe pattern. The light reflected by the object is recorded. The recording may be carried out by a camera. The recording may in particular be an image taken by a camera. Typically, the camera includes an optical unit and an areal recording sensor, in particular a charge-coupled device (CCD) sensor or Complementary metal-oxide-semiconductor (CMOS) sensor. The recording may be evaluated for determining the 3D coordinates. This is typically carried out in an evaluating device, in particular in a computer, more particularly in a personal computer (PC).

According to an aspect of the invention, the exposure for the recording is determined. In so doing, the exposure time for the recording is determined. However, alternatively or additionally, it is also possible to determine one or more other parameters of the exposure, in particular the stop of the camera, the sensitivity of the areal sensor of the camera and/or the intensity of the exposure, i.e., of the projected pattern, in particular stripe pattern.

In the method according to an aspect of the invention, a recording of the object is initially produced with a predetermined exposure, in particular with a predetermined exposure time. A mask image is produced from this recording, in which mask image the regions of the object lying within the measurement volume are depicted. In other words, the mask image contains regions of the object which lie within the measurement volume and regions lying outside thereof. In one preferred configuration, those regions of the object in the mask image, which lie geometrically within the measurement volume but cannot be measured as a result of shading, can be identified as lying outside the measurement volume.

The exposure for the recording for determining the 3D coordinates of the object is determined depending on the predetermined exposure, depending on the mean grey scale value in the regions, lying within the measurement volume, of the recording with a predetermined exposure and depending on an ideal greyscale value. In so doing, it is possible to determine the exposure time for the recording. However, alternatively or additionally, it is also possible to determine one or more other parameters of the exposure for the recording, in particular the stop, the sensitivity and/or the intensity of the exposure. The exposure for the recording is determined depending on the predetermined exposure, the predetermined exposure time, stop, sensitivity and/or exposure intensity. Further, the exposure is determined depending on the mean greyscale value of those regions of the recording with a predetermined exposure which lie within the measurement volume and depending on an ideal greyscale value for these regions. The ideal greyscale value is typically a predetermined greyscale value.

An advantage which may be achieved according to an aspect of the invention is that only a single recording, namely the recording with a predetermined exposure, is required for determining the exposure. A further advantage which may be achieved is that, for the purposes of determining the exposure for the recording, use is made only of those regions of the object which lie within the measurement volume. That is to say, the object lying within the measurement volume on the one hand and the background on the other hand may be separated from one another.

It is possible to carry out the method in real time. In particular, the method may be applied continuously to each frame in a continuous sequence of recordings, in particular video recordings. As soon as the exposure of the recording scene changes, it is possible to immediately calculate the newly required exposure, in particular the exposure time.

For the purposes of determining the 3D coordinates of the object, a recording of the object with the exposure determined according to an aspect of the invention is produced and evaluated.

According to an aspect of the invention, the exposure time is determined in accordance with the formula $$t_1 = \frac{b_{opt}}{b_n} t_0.$$

In the above formula, $b_{opt}$ denotes an ideal greyscale value, $b_n$ denotes the mean greyscale value in the regions lying within the measurement volume of the recording of the object with a predetermined exposure time and $t_0$ denotes the predetermined exposure time of the recording of the object. From these values, the exposure time $t_1$ is calculated.

The aforementioned formula applies to a linear camera, in particular to an industrial camera. However, it is also possible to use a nonlinear camera provided that the law of nonlinearity is known or may at least be approximated. In this case, the aforementioned formula must be adapted to the nonlinearity. It then contains a nonlinearity factor for the nonlinear camera.

In one exemplary embodiment, the exposure is determined based on the image greyscale values and in particular based on a mean greyscale value even if no region of the recording lies within the measurement volume. The present invention can therefore be used for example even for measuring methods of the type in which the camera used to create the recording is moved relative to the object before or during the measurement.

Typically, a weighting of the greyscale values is performed to determine the (ideal) exposure. In particular, the weighting of the greyscale values can be carried out in the context of determining the mean greyscale value.

The greyscale values may be the greyscale values at support points within the recording.

Typically, in the context of the weighting, bright regions are weighted more heavily than dark regions. The weighting can be carried out, e.g., by including only specific greyscale values in the determination and by weighting the specific greyscale values with one, for example, and by weighting other greyscale values, not being included in the determination, with zero.

By way of example, the (ideal) exposure and/or the mean greyscale value can be determined based on a predetermined proportion of all support points present, for which purpose the support points present are sorted according to brightness and only the support points having the highest brightness are selected.

Such a weighting can be carried out if the determination of the (ideal) exposure and/or the mean greyscale value is carried out based on regions of the recording lying within and/or outside the measurement volume.

In accordance with one preferred configuration of the present invention, the exposure is determined exclusively based on regions of the recording lying within the measurement volume as soon as a predetermined number of support points are present within the measurement volume. Therefore, if enough greyscale values are present within the measurement volume, greyscale values outside the measurement volume can be disregarded.

Typically, however, the exposure is also determined based on regions of the recording lying outside the measurement volume as long as there is not yet a predetermined number of support points within the measurement volume. As a result, flicker of the image as a result of artefacts and/or during transition will be avoided.

Moreover, the transition from a determination based on regions outside the measurement volume to a determination based on regions within the measurement volume takes place in a smooth manner. In particular, for this purpose, the regions lying within the measurement volume are weighted more heavily than regions lying outside the measurement volume.

Typically, support points are used to determine the exposure and/or the mean greyscale value. As a result, it is not necessary to use all pixels lying in the regions taken as a basis for the determination. The support points are distributed uniformly in the regions lying within the measurement volume and/or form a uniform grid. In the regions lying outside the measurement volume, the support points are arranged more densely in the centre of the recording than at the edges.

In accordance with one preferred configuration of the present invention, determining the regions lying within the measurement volume involves determining the regions of the recording in which the projected pattern is discernible and/or satisfies a predefined quality criterion.

This is typically done by evaluating the recording. In particular, in this case those regions in which the pattern is present with sufficient sharpness, brightness and/or detail fidelity are considered to lie within the measurement volume. In the case of a stripe pattern, this means, for example, that those regions in which closely adjacent parallel stripes are present are considered to lie within the measurement volume.

Alternatively, the regions of the recording in which the projected pattern is discernible and/or satisfies a predefined quality criterion can also be determined based on a known relative position between the object and the measuring system and a known shape of the object, e.g., based on a CAD model of the object.

With further preference, those regions in which the projected pattern is not discernible and/or does not satisfy the predefined quality criterion are considered to lie outside the measurement volume.

The determination of the regions lying within and outside the measurement volume is typically carried out for creating the mask image.

In accordance with a further, independent aspect of the invention, a method is provided for adapting the exposure, in particular the exposure time ($t_1$), for a recording in a method for determining the 3D coordinates of an object, in which a pattern is projected onto the object and the light reflected by the object is recorded, wherein a recording of the object is produced with a predetermined exposure, in particular exposure time ($t_0$). In accordance with a second aspect of the invention, regions of the recording are determined in which the projected pattern is discernible and/or satisfies a predefined quality criterion, wherein the adaptation of the exposure is carried out based on an exposure value, in particular based on a mean greyscale value, of the determined regions.

Typically, the regions of the recording in which the projected pattern is discernible and/or satisfies a predefined quality criterion are determined in the manner already described in greater detail above.

Furthermore, those preferred configurations which have been described above for the first aspect of the present invention may also be used in the same way for the development of the second aspect of the invention.

With further preference, the determination of the exposure in accordance with the first aspect of the invention serves for adapting the exposure, typically for adapting the exposure in accordance with the second aspect of the invention.

It is advantageous if an edge filter is applied to the recording with a predetermined exposure. Typically, this is a contrast-based edge filter. Sobel, Laplace and/or Canny edge filters are particularly suitable. Here, it is advantageous to adapt the filter size, filter direction and/or sensitivity in accordance with the employed camera resolution and the employed pattern parameters, in particular the stripe width, in such a way that edges in the camera image arise and are detected along the (perpendicularly) projected stripes. Mainly, or only, edges within the measurement volume are detected on account of the falling camera sharpness and/or projector sharpness outside of the measurement volume and/or the falling image brightness outside of the measurement volume. As a result, the region of the measurement volume may be distinguished from the region lying outside of the measurement volume. The production of the mask image may be simplified or facilitated by the edge filter.

It is advantageous if the filter direction is set depending on the projected pattern. In particular, it may be set depending on whether perpendicular stripes or horizontal stripes are projected. It is advantageous if the filter direction is set by rotating a filter kernel.

It is further advantageous if the sensitivity of the filter is set. To this end, it is possible, in particular, to set a greyscale value jump. The greyscale value jump may set a threshold for identifying an edge in the camera image. This may ensure that it is possible to reliably detect an edge in the camera image and that extraneous edges are not inadvertently identified, for example on account of the camera noise.

It is advantageous if the filter size is set. In particular, the filter size may be set by the width of the recorded stripes in the camera image. The width of the recorded stripes may vary depending on camera resolution and/or projector resolution. Instead of adapting the filter size, or in addition to an adaptation, it is also possible to change the image size, e.g., to reduce or increase the image size, as a result of which the stripe width in the image likewise changes.

According to a further aspect of the invention, a thresholding method is applied to the recording to which the edge filter was applied. Here, this may be the Otsu thresholding method. The edge image may be converted into a binary image by using a thresholding method.

The mask image can be created based on the binary image. Such a binary image representing the mask image only contains two greyscale values, firstly white regions, which lie within the measurement volume, and secondly black regions, which lie outside of the measurement volume.

An improved mask image may be generated by the thresholding method.

In the context of creating the mask image, typically, edges lying outside the measurement volume are removed and/or edges running within the measurement volume are closed. Edges considered to be running within the measurement volume are those edges which occur in a clustered fashion and/or lie close together in the recording. The edges may be closed by regions without edges and/or between the projected stripes being treated as lying within the measurement volume. Edges may be removed by edges outside of the measurement volume being deleted. Edges considered to lie outside the measurement volume are edges of the type which lie individually and/or far away from other edges.

The distinction may thus be carried out by edges outside of the measurement volume not occurring in a clustered form such that they may be identified as not belonging to the measurement volume. Edges may be closed and removed by mathematical morphologies.

The invention further relates to an apparatus for carrying out the method according to an aspect of the invention. The apparatus includes a projector for projecting a pattern onto the object and at least one camera for recording the light reflected by the object. It may further include an evaluating device for determining the 3D coordinates of the object. According to an aspect of the invention, the apparatus includes a device for generating a mask image of a recording of the object with a predetermined exposure and a device for determining the exposure depending on the predetermined exposure, depending on the mean greyscale value in the regions, lying within the measurement volume, of the recording with a predetermined exposure and depending on an ideal greyscale value.

It is advantageous if the apparatus includes a device for determining the exposure time according to the formula $$t_1 = \frac{b_{opt}}{b_n} t_0$$

and/or a device for applying an edge filter to the recording with a predetermined exposure and/or a device for applying a thresholding method to the recording to which the edge filter was applied.

The present invention furthermore includes an apparatus including a projector for projecting a pattern onto the object and a camera for recording the light reflected by the object, and also a device for automatically determining and/or adapting the exposure in accordance with one of the methods described above.

Typically, for this purpose the apparatus includes a controller programmed to carry out such a method. In particular, the controller for this purpose includes a microprocessor and a memory in which a program having instructions for carrying out such a method is stored.

BRIEF DESCRIPTION OF THE DRAWINGS

The invention will now be described with reference to the drawings wherein.

DESCRIPTION OF EXEMPLARY EMBODIMENTS

Figure 1:
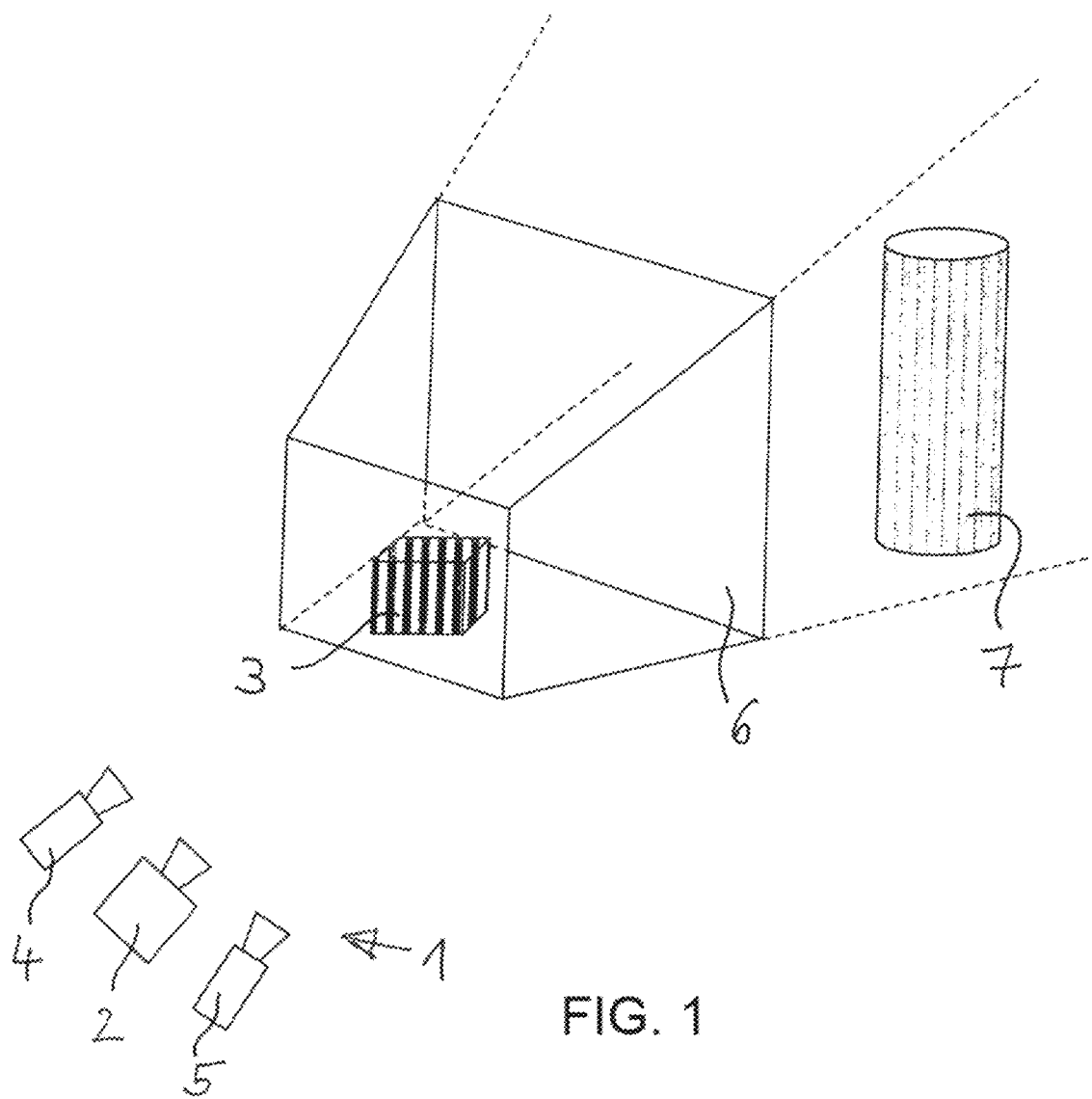
FIG. 1 shows an apparatus for determining the 3D coordinates of an object.

The apparatus, shown in FIG. 1, for determining the 3D coordinates of an object includes a 3D sensor 1, which includes a projector 2, and two cameras 4 and 5. The projector 2 projects a stripe pattern onto the object 3. The cameras 4 and 5 record the object 3. The object 3 is located within the measurement volume 6. Further objects 7 may be present outside of the measurement volume 6.

Figure 2:
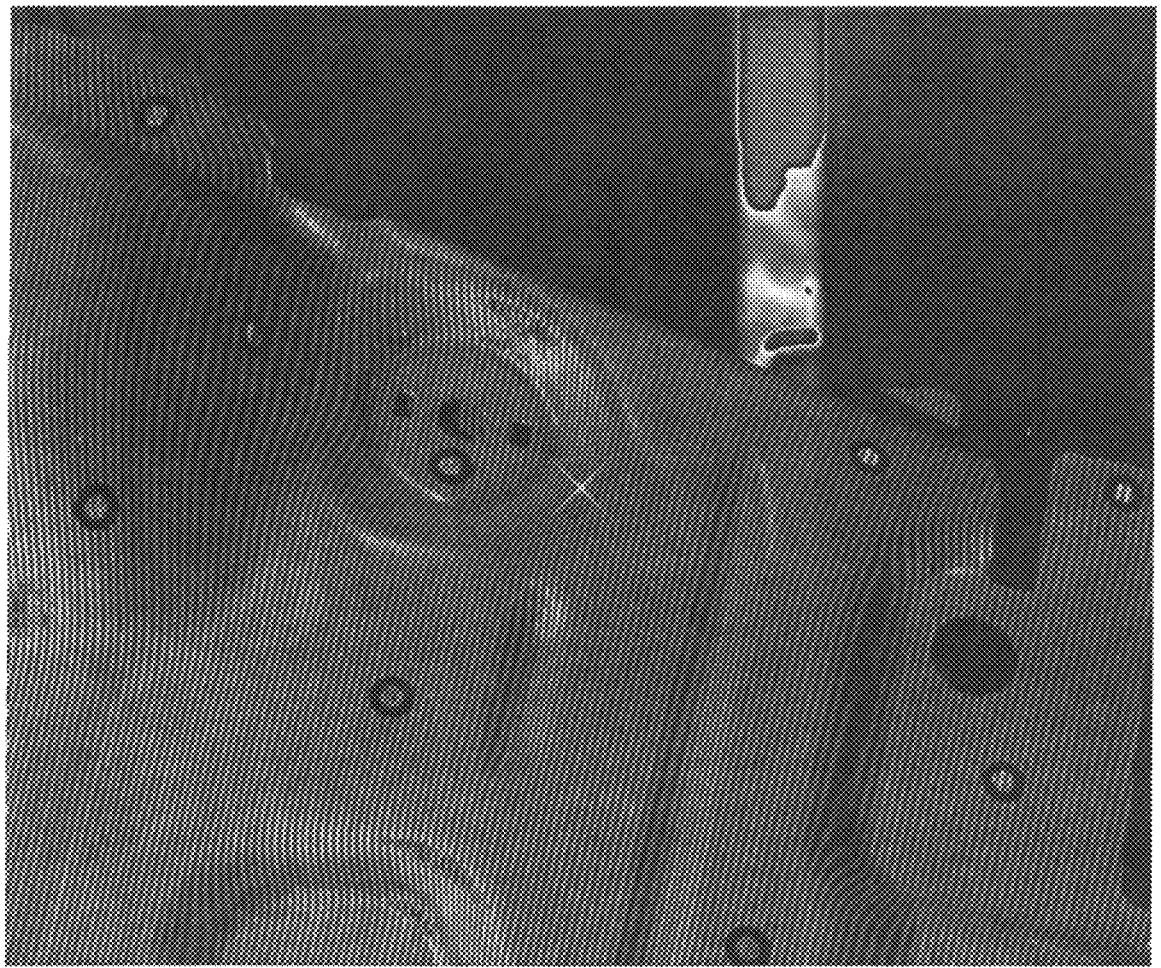
FIG. 2 shows a recording of the object with a predetermined exposure time.

FIG. 2 shows an example of a recorded stripe image which was produced with a predetermined exposure, in particular with a predetermined exposure time $t_0$. A contrast-based edge filter (e.g., Sobel, Laplace, Canny algorithm) for edge detection is applied to this stripe image. Filter size, filter direction and sensitivity may be adapted in accordance with the employed camera resolution and the employed stripe width in such a way that edges are detected in the camera image along the stripes projected (perpendicularly) by the projector 2. Mainly, or only, edges within the measurement volume are detected on account of the falling camera/projector sharpness outside of the measurement volume 6 and the falling image brightness.

Figure 3:
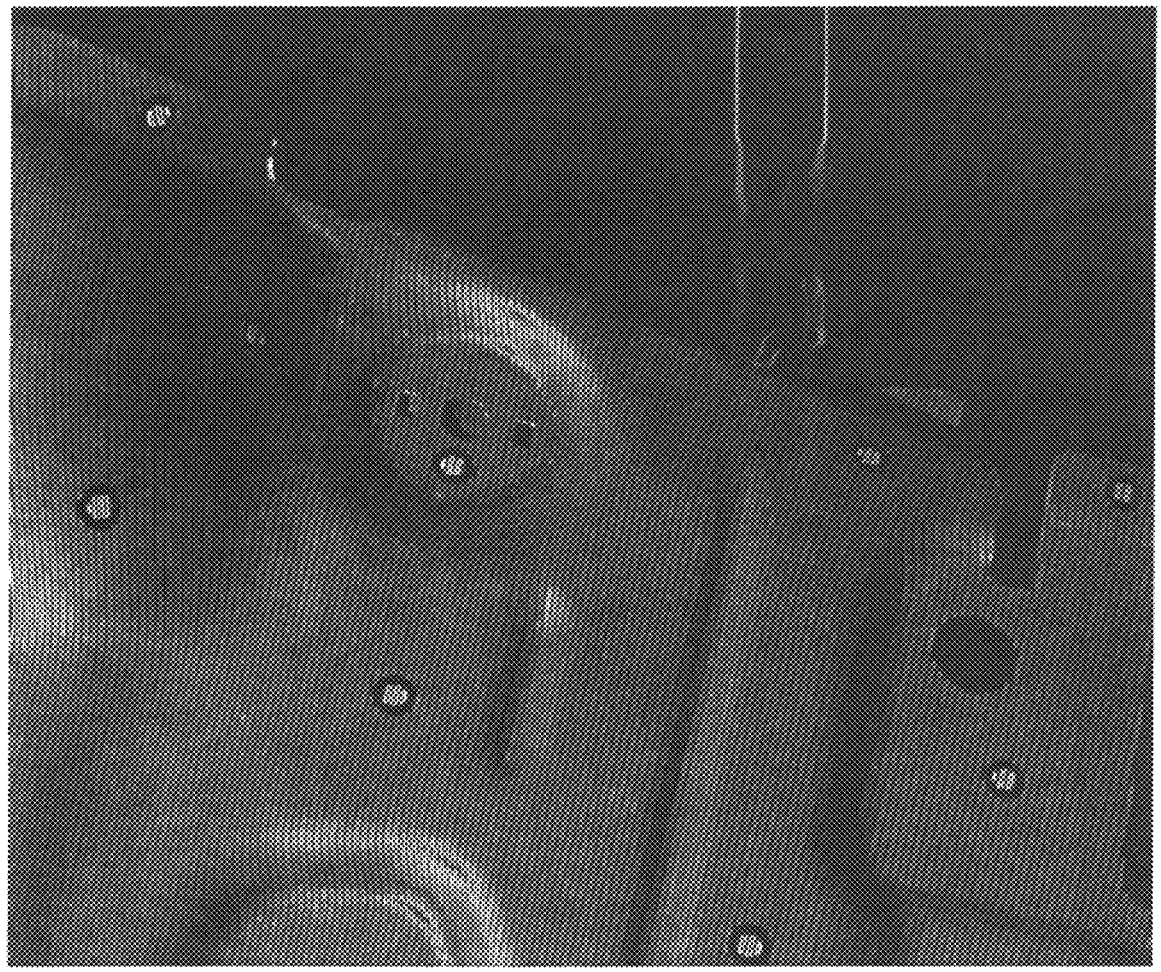
FIG. 3 shows the image in accordance with FIG. 2 after applying an edge filter.
Figure 4:
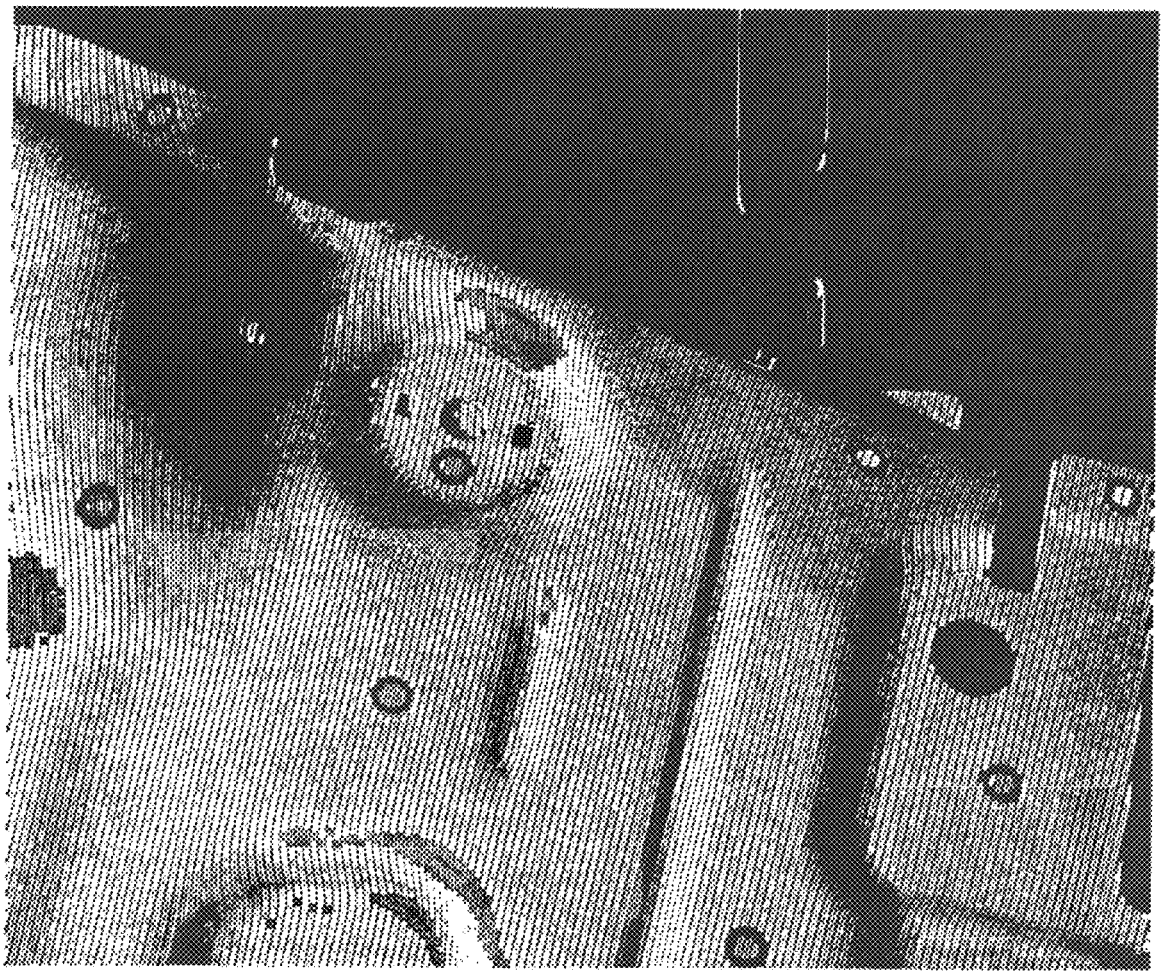
FIG. 4 shows the image in accordance with FIG. 3 after applying a thresholding method.
Figure 5:
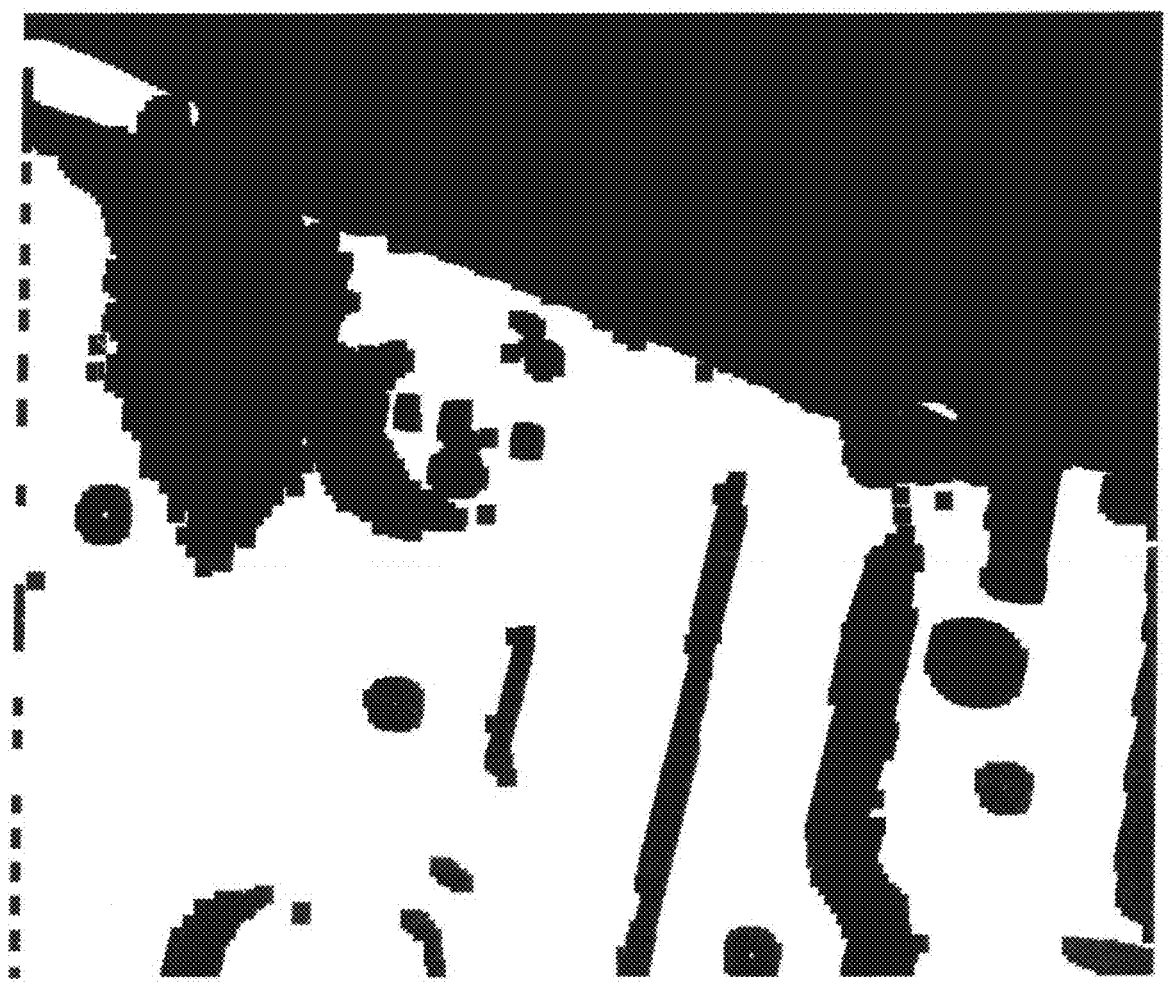
FIG. 5 shows a mask image which was produced from the image in accordance with FIG. 4.

The edge image thus generated is shown in FIG. 3. Depending on the recording situation, this edge image also contains edge elements which may lie outside of the measurement volume. By using a thresholding method (e.g., the Otsu thresholding method), the edge image in accordance with FIG. 3 is converted into a binary image in accordance with FIG. 4. Since a plurality of virtually parallel edges may extend on the object 3 on account of the projected pattern, it is possible both to remove the detected edges outside of the measurement volume 6 and to close the edges, extending closely parallel, on the object 3 with the aid of known image processing methods (e.g., mathematical morphologies). A mask image in accordance with FIG. 5 is generated in this way from the binary image in accordance with FIG. 4. The mask image in accordance with FIG. 5 only contains, or virtually only contains, valid pixels on the object 3.

The exposure time $t_1$ is determined for the recordings for determining the 3D coordinates of the object 3 based on the regions of the object 3 which lie within the measurement volume 6 and which are visible from the mask image in accordance with FIG. 5. To this end, the mean greyscale value $b_n$ in the initial image in accordance with FIG. 2 is determined within the regions which are visible from the mask image in accordance with FIG. 5. Further, an ideal greyscale value $b_{opt}$ is determined. The ideal greyscale value may be set in advance. By way of example, it may be determined empirically depending on the sensor configuration. On account of the linearity of the camera, the required exposure time $t_1$ may be calculated according to the following formula:

$$t_1 = \frac{b_{opt}}{b_n} t_0.$$

Should the predetermined exposure time $t_0$ of the initial image in accordance with FIG. 2 be too high, it is possible to produce a second image as an initial image with a lower exposure time. This may be carried out, in particular, if the exposure time of the initial image is so high that the object undergoes a white-out in the camera image (greyscale value 256). The overexposed scenes may be identified by analytic evaluation of the image, for example, by calculating the size of the contrast mask, the number of overexposed pixels, and checking the unsharpness of the image based on the variance of the edge image.

The exposure controller also performs a determination or adaptation of the exposure even if there is not yet any region in the measurement volume or if the object moves into the measurement volume.

If there is not yet any region in the measurement volume, the exposure controller is intended to regulate the image in just the same way as the region in the measurement volume later, such that the user can also recognize where the sensor camera is currently "looking". If the sensor is moved in the direction of the object to be measured, and the object dips into the measurement volume, a sudden change in the image brightness (flicker) ought not to occur. Rather, the transition until the point when the exposure controller concentrates exclusively on the region within the measurement volume is intended to be effected as fluidly as possible.

This is done as follows in the exemplary embodiment:

In the exemplary embodiment, not all of the pixels of the recording are used for determining the exposure, rather individual pixels are selected as support points. The image pixels serving as support points are sorted: Bright pixels take precedence over darker pixels (high greyscale values over lower values). However, those pixels which image the regions of the object and which are located within the measurement volume take priority. Depending on their rank in the sorted list, the pixels are included with a corresponding weighting in the calculation of the exposure control.

EXAMPLE

An image includes 24 pixels as support points and has the following greyscale values:

| Pixel No. | greyscale value | Component in the measurement volume |
|---|---|---|
| 1 | 50 | Yes |
| 2 | 36 | Yes |
| 3 | 154 | No |
| 4 | 23 | Yes |
| 5 | 47 | No |
| 6 | 68 | No |
| 7 | 94 | Yes |
| 8 | 215 | No |
| 9 | 120 | No |
| 10 | 135 | Yes |
| 11 | 87 | Yes |
| 12 | 69 | Yes |
| 13 | 32 | No |
| 14 | 25 | No |
| 15 | 49 | No |
| 16 | 67 | No |
| 17 | 82 | No |
| 18 | 26 | No |
| 19 | 216 | Yes |
| 20 | 203 | No |
| 21 | 198 | No |
| 22 | 185 | No |
| 23 | 165 | No |
| 24 | 178 | No |

These pixels are sorted as follows and acquire an (exemplary) weighting:

| Pixel No. | greyscale value | Component in the measurement volume | Weighting |
|---|---|---|---|
| 19 | 216 | Yes | 10 |
| 10 | 135 | Yes | 10 |
| 7 | 94 | Yes | 10 |
| 11 | 87 | Yes | 10 |
| 12 | 69 | Yes | 10 |
| 1 | 50 | Yes | 9 |
| 2 | 36 | Yes | 8 |
| 4 | 23 | Yes | 7 |
| 8 | 215 | No | 6 |
| 20 | 203 | No | 5 |
| 21 | 198 | No | 4 |
| 22 | 185 | No | 3 |
| 24 | 178 | No | 2 |
| 23 | 165 | No | 1 |
| 3 | 154 | No | 0 |
| 9 | 120 | No | 0 |
| 17 | 82 | No | 0 |
| 6 | 68 | No | 0 |
| 16 | 67 | No | 0 |
| 15 | 49 | No | 0 |
| 5 | 47 | No | 0 |
| 13 | 32 | No | 0 |
| 18 | 26 | No | 0 |
| 14 | 25 | No | 0 |

The weighting can also be performed as a pure yes/no decision, that is to say, depending on their rank in the sorted list, the pixels are included with in each case the same weighting in the calculation of the exposure control or are not included therein, that is to say have a weighting of zero.

As soon as a sufficiently large portion of the object is located in the measurement volume, the other regions are no longer taken into consideration (weighting zero). This is carried out automatically by the regions within the measurement volume being sorted with precedence over the regions outside the measurement volume in the list.

In one exemplary embodiment, the proportion of pixels or support points included in the assessment can be between 0.5% and 10% of all pixels or support points.

The invention allows the exposure time required in a stripe projection system for an object to be measured to be determined from a single recording. Here, only the object to be measured which is illuminated by a specific stripe pattern and located within the field of view of the system is taken into account. Thus, the object to be measured may be considered independently of the background. Disturbing effects in the background have no influence on the determining of the exposure time. The exposure time may be determined in real time. This achieves advantages in relation to known solution approaches, which either require at least two recordings with differently projected patterns and/or different exposure times and/or different projector intensities, or are unable to separate the desired object to be measured from the background, leading to image regions from the background also being included in the calculation of the exposure time. These disadvantages are avoided by the exemplary embodiments of invention.

The method according to an exemplary embodiment of the invention may be carried out with a monochrome camera. However, it may also be realized with a colour camera.

It is understood that the foregoing description is that of the exemplary embodiments of the invention and that various changes and modifications may be made thereto without departing from the spirit and scope of the invention as defined in the appended claims.

What is claimed is:

1. A method for determining an exposure time $t_1$ for a recording to determine 3D coordinates of an object, the method comprising:
   projecting a pattern onto the object;
   recording light reflected by the object;
   producing a first recording of the object with a predetermined exposure time $t_0$;
   determining regions of the first recording in which a projected pattern is at least one of discernible and satisfying a predefined quality criterion; and
   determining the exposure time $t_1$ for a second recording depending on a mean greyscale value of the regions determined in the first recording.

2. The method according to claim 1, wherein the exposure time $t_1$ is determined based on image greyscale values of the first recording even if no region of the recording lies within a measurement volume, wherein a weighting of the image greyscale values is carried out for determining an ideal exposure time, and wherein bright regions are weighted more heavily.

3. The method according to claim 1, further comprising:
   applying an edge filter to the recording with the predetermined exposure time $t_0$.

4. The method according to claim 3, further comprising:
   applying a thresholding method to the recording to which the edge filter was applied.

5. The method of claim 1, wherein the regions of the first recording in which the projected pattern is at least one of discernible and satisfying the predefined quality criterion are determined by evaluating the recording to determine the regions of the first recording in which closely adjacent parallel stripes are present.

6. The method of claim 1, wherein the regions of the first recording in which the projected pattern is at least one of discernible and satisfying the predefined quality criterion are determined based on a known relative position between the object and a measuring system including a projector and a camera and based on a known shape of the object.

7. The apparatus of claim 1, wherein the regions of the first recording in which the projected pattern is at least one of discernible and satisfying the predefined quality criterion are determined based on a known relative position between the object and a measuring system including a projector and a camera and based on a known shape of the object.

8. The method of claim 1, wherein the exposure time $t_1$ is determined according to the formula:

$$t_1 = \frac{b_{opt}}{b_n} t_0$$

wherein $b_n$ is the mean greyscale value of the regions determined in the first recording and $b_{opt}$ is an ideal greyscale value.

9. The method of claim 1, wherein the exposure time $t_1$ is determined exclusively based on the regions of the recording lying within a measurement volume when a predetermined number of support points are present within the measurement volume, wherein a transition from a determination based on the regions lying outside the measurement volume to a determination based on the regions lying within the measurement volume takes place smoothly by including the regions lying within the measurement volume in the weighting, and by weighting the regions lying within the measurement volume more heavily than the regions lying outside the measurement volume.

10. An apparatus for carrying out the method according to claim 1, the apparatus comprising:
    a projector configured to project the pattern onto the object;
    a camera configured to record the light reflected by the object;
    a microprocessor configured to determine regions of a first recording in which the projected pattern is at least one of discernible and satisfying the predefined quality criterion; and
    the microprocessor being further configured to determine the exposure time $t_1$ for a second recording depending on a mean greyscale value of the regions determined in the first recording.

11. The apparatus according to claim 10, wherein the microprocessor is further configured to at least one of:
    determine the exposure time $t_1$ according to the formula $$t_1 = \frac{b_{opt}}{b_n} t_0;$$

wherein $b_n$ is the mean greyscale value of the regions determined in the first recording and $b_{opt}$ is an ideal greyscale value;
   apply an edge filter to the first recording with the predetermined exposure time $t_0$; and
   apply a thresholding method to the recording to which the edge filter was applied.

12. The apparatus of claim 10, wherein the regions of the first recording in which the projected pattern is at least one of discernible and satisfying the predefined quality criterion are determined by evaluating the recording to determine the regions of the first recording in which closely adjacent parallel stripes are present.

13. The apparatus of claim 10, wherein the exposure time $t_1$ is determined exclusively based on the regions of the recording lying within a measurement volume when a predetermined number of support points are present within the measurement volume, wherein a transition from a determination based on the regions lying outside the measurement volume to the determination based on the regions lying within the measurement volume takes place smoothly by including the regions lying within the measurement volume in the weighting, and by weighting the regions lying within the measurement volume more heavily than the regions lying outside the measurement volume.

14. A method for determining an exposure time $t_1$ for a recording to determine 3D coordinates of an object, the method comprising:
    projecting a pattern onto the object;
    recording light reflected by the object;
    producing a first recording of the object with a predetermined exposure time $t_0$;
    determining in the first recording regions of the object lying within a measurement volume; and
    determining the exposure time $t_1$ for a second recording depending on:
    the predetermined exposure time $t_0$,
    a mean greyscale value bn of the regions determined in the first recording, and
    an ideal greyscale value $b_{opt}$,
    wherein the exposure time $t_1$ is determined according to the formula $$t_1 = \frac{b_{opt}}{b_n} t_0.$$

15. The method according to claim 14, wherein the exposure time $t_1$ is determined based on image greyscale values even if no region of the first recording lies within the measurement volume, wherein a weighting of the image greyscale values is carried out for determining an ideal exposure time, and wherein bright regions are weighted more heavily.

16. A method for determining an exposure time $t_1$ for a recording to determine 3D coordinates of an object, the method comprising:
    projecting a pattern onto the object;
    recording light reflected by the object;
    producing a first recording of the object with a predetermined exposure time $t_0$;
    determining in the first recording regions of the object lying within a measurement volume; and
    determining the exposure time $t_1$ for a second recording depending on a mean greyscale value of regions determined in the first recording,
    wherein the exposure time $t_1$ is determined exclusively based on the regions of the recording lying within the measurement volume when a predetermined number of support points are present within the measurement volume, wherein a transition from a determination based on regions lying outside the measurement volume to a determination based on regions lying within the measurement volume takes place smoothly by including regions lying within the measurement volume in the weighting, and by weighting the regions lying within the measurement volume more heavily than the regions lying outside the measurement volume.

17. The method according to claim 16, wherein the regions of the recording are determined in which a projected pattern is at least one of discernible and satisfying a predefined quality criterion, wherein for generating a mask image, those regions in which the projected pattern is at least one of not being discernible and not satisfying the predefined quality criterion are considered to lie outside the measurement volume.

* * * * *